United States Patent
Czarnecki

(10) Patent No.: US 11,091,100 B2
(45) Date of Patent: Aug. 17, 2021

(54) WORK VEHICLE MULTI-CAMERA VISION SYSTEMS

(71) Applicant: Deere & Company, Moline, IL (US)

(72) Inventor: Nathaniel M. Czarnecki, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 11 days.

(21) Appl. No.: 16/591,948

(22) Filed: Oct. 3, 2019

(65) Prior Publication Data
US 2021/0101540 A1 Apr. 8, 2021

(51) Int. Cl.
*B60R 11/04* (2006.01)
*G06K 9/00* (2006.01)

(52) U.S. Cl.
CPC .......... *B60R 11/04* (2013.01); *G06K 9/00805* (2013.01); *B60R 2300/105* (2013.01); *B60R 2300/802* (2013.01); *B60R 2300/8053* (2013.01); *B60R 2300/8093* (2013.01)

(58) Field of Classification Search
None
See application file for complete search history.

(56) References Cited

U.S. PATENT DOCUMENTS

| | | | |
|---|---|---|---|
| 7,984,574 B2 | 7/2011 | Pfohl et al. | |
| 9,227,568 B1* | 1/2016 | Hubbell | B60R 1/081 |
| 9,440,591 B2 | 9/2016 | Hendron et al. | |
| 9,487,139 B1* | 11/2016 | Ishida | B60Q 9/008 |
| 10,035,458 B2* | 7/2018 | Sawada | B60R 1/00 |
| 10,391,940 B2* | 8/2019 | Izumikawa | B60R 1/00 |
| 10,412,889 B2* | 9/2019 | Palla | A01D 41/1274 |
| 10,754,545 B2* | 8/2020 | Diaz | G06F 3/04886 |
| 2003/0122930 A1* | 7/2003 | Schofield | H04N 7/181 348/148 |

(Continued)

FOREIGN PATENT DOCUMENTS

WO WO2019181865 A1 3/2021

OTHER PUBLICATIONS

Deere & Company, pending USPTO Utility U.S. Appl. No. 16/667,356, filed Oct. 29, 2019.

*Primary Examiner* — Tyler W. Sullivan
(74) *Attorney, Agent, or Firm* — Klintworth & Rozenblat IP LLP

(57) ABSTRACT

A multi-camera vision system utilized onboard a work vehicle includes, among other components, vehicle cameras and a display device utilized within an operator station of the work vehicle. The vehicle cameras provide vehicle camera feeds of the work vehicle's surrounding environment, as captured from different vantage points. A controller, which is coupled to the vehicle cameras and to the display device, is configured to: (i) generate, on the display device, a multi-camera display including framing icons, gallery display areas within the framing icons, and a main display area; (ii) identify a currently-selected vehicle camera feed and one or more non-selected vehicle camera feeds from the multiple vehicle camera feeds; and (iii) present the currently-selected vehicle camera feed in the main display area of the multi-camera display, while concurrently presenting the one or more non-selected vehicle camera feeds in a corresponding number of the gallery display areas.

17 Claims, 7 Drawing Sheets

(56) References Cited

U.S. PATENT DOCUMENTS

| | | | |
|---|---|---|---|
| 2010/0194596 A1* | 8/2010 | Wang | B60R 1/00 340/936 |
| 2011/0032357 A1* | 2/2011 | Kitaura | G06T 5/006 348/148 |
| 2011/0137529 A1* | 6/2011 | Locke | B60R 1/00 701/49 |
| 2015/0015479 A1* | 1/2015 | Cho | B60K 35/00 345/156 |
| 2015/0062141 A1* | 3/2015 | Hayasaka | B60R 1/00 345/581 |
| 2015/0165975 A1* | 6/2015 | Meadows | B60R 1/00 701/49 |
| 2015/0256795 A1* | 9/2015 | Chauhan | G06Q 10/10 348/14.02 |
| 2015/0360565 A1* | 12/2015 | Goto | B60R 1/00 701/36 |
| 2016/0332569 A1 | 11/2016 | Ishida et al. | |
| 2018/0094408 A1* | 4/2018 | Shintani | G01C 9/04 |
| 2018/0222391 A1* | 8/2018 | Chen | H04N 5/232933 |
| 2018/0272940 A1* | 9/2018 | Saeki | G06K 9/00805 |
| 2019/0211532 A1* | 7/2019 | Sakamoto | H04N 7/183 |
| 2020/0134396 A1* | 4/2020 | Porta | B60R 1/00 |
| 2020/0333946 A1* | 10/2020 | Yoshii | G06F 3/0482 |
| 2020/0407948 A1 | 12/2020 | Seki | |

\* cited by examiner

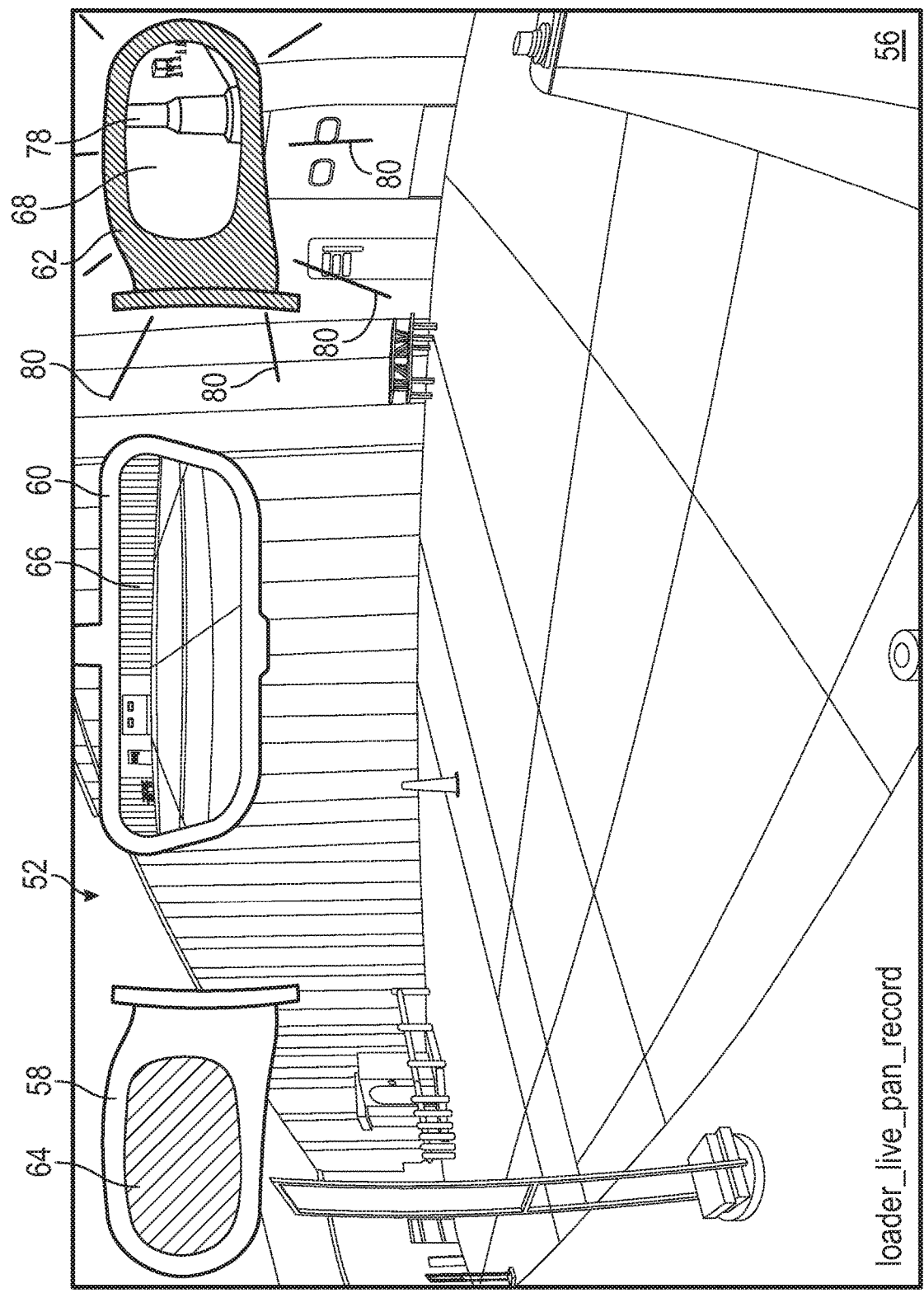

WORK VEHICLE MULTI-CAMERA VISION SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle multi-camera vision system, which enables an operator of a work vehicle to monitor and intuitively navigate between multiple camera feeds providing different views of a work vehicle's surrounding environment.

BACKGROUND OF THE DISCLOSURE

Work vehicles utilized within construction, agriculture, forestry, mining, and other industries commonly operate in challenging work environments. Operators are often required to carefully navigate such work vehicles, while performing various tasks and avoiding surrounding structures, neighboring work vehicles, and other obstacles. A given work vehicle may be a sizable and complex machine, requiring a relatively high level of operator skill to control the various functions of the work vehicle, in many instances including the movement of boom-mounted implements or other end effectors. Concurrently, visibility from the operator station or cabin of the work vehicle may be limited by the chassis of the work vehicle, by the positioning of a bucket or other end effector relative to the cabin, or other visual hinderances. For this reason, certain work vehicles are now equipped with camera systems or "vision systems" providing operators with relatively unobstructed views of a work vehicle's surrounding environment. As a specific example, a work vehicle may be equipped with a vision system providing an operator with a view of the environment generally to the rear of the work vehicle, as presented on a display screen within the work vehicle cabin and captured by a camera mounted to the work vehicle at an optimal vantage point location. This not only improves operator efficiency and situational awareness by providing an unobstructed rear view of the work vehicle's surrounding environment, but may also improve operator comfort by enabling the operator to remain seated in a forwarding-facing position, while viewing the display screen and operating the work vehicle in reverse.

SUMMARY OF THE DISCLOSURE

Multi-camera vision system utilized in conjunction with work vehicles are disclosed. In embodiments, the multi-camera vision system includes a display device and vehicle cameras providing vehicle camera feeds of a surrounding environment of the work vehicle, as captured from different vantage points. A controller is operably coupled to the vehicle cameras and to the display device. The controller configured to: (i) generate, on the display device, a multi-camera display including framing icons, gallery display areas within the framing icons, and a main display area; (ii) identify a currently-selected vehicle camera feed and one or more non-selected vehicle camera feeds from the multiple vehicle camera feeds; and (iii) present the currently-selected vehicle camera feed in the main display area of the multi-camera display, while concurrently presenting the one or more non-selected vehicle camera feeds in a corresponding number of the gallery display areas.

In further embodiments, the multi-camera vision system includes a display device utilized within the operator station of a work vehicle; a first vehicle camera providing a first vehicle camera feed of the work vehicle's surrounding environment, as captured from a first vantage point; and a second vehicle camera providing a second vehicle camera feed of the work vehicle's surrounding environment, as captured from a second vantage point different than the first vantage point. A controller is operably coupled to the first vehicle camera, to the second vehicle camera, and to the display device. The controller is configured to: (i) generate, on the display device, a multi-camera display including a main display area, a first gallery display area, and a second gallery display area; (ii) determine when an operator selects a new camera feed for presentation on the main display area; (iii) switch presentation of the first video camera feed from the first gallery display area to the main display area when the first video camera feed is selected for primary presentation; and (iv) switch presentation of the second video camera feed from the second gallery display area to the main display area when the second video camera feed is selected for primary presentation.

In still other implementations, the multi-camera vision system includes a display device utilized within the operator station of the work vehicle; first and second rear vehicle cameras providing first and second rear vehicle camera feeds of an area located generally to the work vehicle's rear, as captured from different vantage points; and a controller coupled to the first rear vehicle camera, to the second rear vehicle camera, and to the display device. The controller is configured to: (i) generate, on the display device, a multi-camera display including a first vehicle rearview mirror assembly icon, a second vehicle rearview mirror assembly icon, and a main display area; (ii) identify a currently-selected camera feed for presentation in the main display area of the multi-camera display; (iii) present the first rear vehicle camera feed in a mirror portion of the first vehicle rearview mirror assembly icon, while concurrently presenting the second rear vehicle camera feed in the main display area when the second rear vehicle camera feed is identified as the currently-selected camera feed; and (iv) present the second rear vehicle camera feed in a mirror portion of the second vehicle rearview mirror assembly icon, while concurrently presenting the first rear vehicle camera feed in the main display area when the first rear vehicle camera feed is identified as the currently-selected camera feed.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 7 is a screenshot of the example multi-camera display shown in FIGS. 3-6 illustrating one manner in which a visual alert may be generated on the multi-camera display to direct operator attention toward a particular camera feed when not currently selected for primary presentation on the main display area of the multi-camera display.

Figure 1:
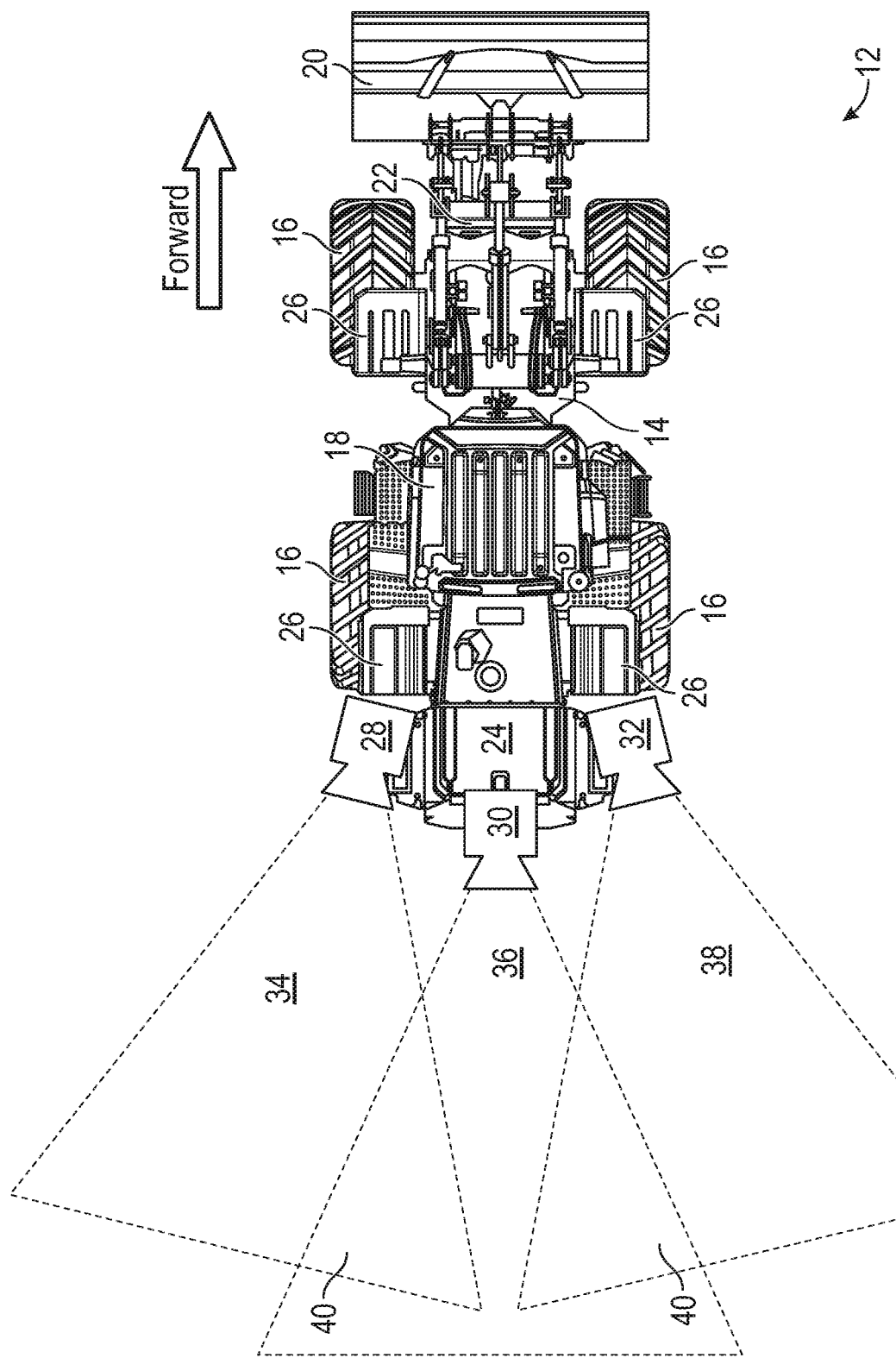
FIG. 1 is a top view of a work vehicle (here, a wheeled loader) equipped with an example embodiment of the multi-camera vision system.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims. As appearing herein, the term "surrounding environment" is utilized in a broad sense to refer to a work environment or area located outside of a work vehicle, whether generally located to the front, to a side, or to the rear of the work vehicle, or any combination thereof. Further, the term "display" refers the composite imagery or "picture" generated on the screen of a display device, while the term "display device" refers to an image-generating device on which a display (e.g., the below-described multi-camera display) is presented.

Overview

As previously noted, certain work vehicles are equipped with vision systems including vehicle cameras providing camera (live video) feeds of a work vehicle's surrounding environment and a display device on which the camera feeds are presented for operator viewing. In certain cases, a single work vehicle may be equipped with a vision system including multiple vehicle cameras (herein, a "multi-camera vision system") for providing an operator with multiple camera feeds of a work vehicle's surrounding environment, as seen from multiple different vantage points located about the work vehicle. Such multi-camera vision systems are useful in the context of work vehicles, specifically, given the relatively large size of many work vehicles, complexities involved in operating work vehicles capable of performing multiple simultaneous work functions, and the dynamic environments within which work vehicles often operate. Additionally, the field of view (FOV) of a given vehicle camera may be partially obstructed by a boom assembly or end effector attached to the work vehicle; or by structural features of the work vehicle body itself, such as walls or corners of the work vehicle's cabin or engine bay. Therefore, in such instances, multiple cameras may be employed to furnish an operator with different views of work vehicle's surrounding environment, with each certain views lacking visual obstructions or hinderances present in other views.

When intelligently designed and implemented, multi-camera vision systems can increase operator situational awareness and efficacy when performing various work tasks, while piloting a work vehicle. This notwithstanding, it can be highly difficult to design a multi-camera vision system simultaneously providing an operator with multiple camera feeds, while further permitting the operator switch between the camera feeds when in a rapid and intuitive manner. Thus, if not properly designed, multi-camera vision systems can potentially intensify operator mental workload and increase heads-down time, particularly as an operator interacts with the vision system to navigate to a desired camera feed or view. It is, of course, possible to present a single camera feed on a display device for operating viewing, while further enabling an operator to select and re-select which camera feed (of multiple available camera feeds) is desirably presented on the display device at a given moment in time. Such an approach is disadvantageous, however, given its tendency to prevent or at least deter an operator from maintaining awareness of the content contained in all available camera feeds when operating the work vehicle.

Overcoming many, if not all of the above-noted disadvantages, the following provides work vehicle multi-camera vision systems enabling operators to monitor and navigate between multiple camera feeds of a work vehicle's surrounding environment in a rapid and highly intuitive manner. In embodiments, the multi-camera vision system includes multiple cameras mounted at different locations about a given work vehicle to capture camera (live video) feeds of the work vehicle's surrounding environment from various different vantage points, viewpoints or viewing angles. The vehicle-mounted cameras (or, more simply, "vehicle cameras") can each capture any desired portion or region of a work vehicle's surrounding environment, whether generally located to the front, to a side, or to the rear of the work vehicle.

Embodiments of the multi-camera vision system further include a controller and at least one display device, which functions within a cabin or other operator station of the work vehicle. During operation of the multi-camera vision system, the controller supplies the display device with appropriate signals (video output signals) to generate a multi-camera display on a screen of the display device. In embodiments, the multi-camera display is generated to include framing icons, gallery display areas within or adjacent the framing icons, and a main display area. As appearing herein, the term "framing icon" refers to a graphic bordering at least a portion, if not the entirety, of the periphery of a gallery display area. A given framing icon can be generated as, for example, a relatively simple visual representation of a frame, a vehicle mirror assembly framing or surrounding a mirror portion (described below), or another object. Comparatively, the term "gallery display area" refers to designated area or region of the multi-camera display reserved for presentation of a particular camera feed, at least when the camera feed is not selected for viewing in the main display area of the multi-camera display.

When a particular camera feed is instead selected for primary presentation (that is, selected for viewing in the main display area of the multi-camera display), the appearance of the gallery display area and/or framing icon corresponding to the currently-selected camera feed may be modified in a predetermined manner. For example, in embodiments, presentation of the currently-selected camera feed in its designated gallery display area may cease (or, perhaps, may be visually obscured in some manner), while the currently-selected camera feed is presented in the main display area of the multi-camera display. This visually reinforces which of the available camera feeds is presently selected for viewing in the main display area to further promote rapid operator comprehension when viewing the multi-camera display.

Embodiments of the multi-camera vision system may include at least one, if not multiple rear vehicle cameras, depending upon work vehicle size, type, and other factors. As appearing herein, the term "rear vehicle camera" refers to a camera at least partially facing to the rear of the work vehicle, and therefore having an FOV capturing an area or region at least partially located behind the work vehicle, regardless of the particular location at which the camera is mounted on the work vehicle. In embodiments in which the multi-camera vision system includes at least one rear vehicle camera, the camera feed captured from the rear vehicle camera (herein, a "rear camera feed") may be presented on the multi-camera display in a manner simulating or mimic a real-world vehicular mirror assembly. Accordingly, in such embodiments, either or both of the following conditions may apply: (i) the controller may present the rear camera feed within the gallery display area of a framing icon having the appearance of a vehicle rearview mirror assembly, and (ii) the controller may visually modify the rear camera feed to more closely correspond with the real-word view seen through a vehicle rear view mirror. With respect to romanette (ii), in particular, the controller may apply a mirror (reverse) image effect to the rear camera feed to more accurately simulate the real-world view viewed through a mirror. Additionally, the controller may scale and size the rear camera feed to fit into the gallery display area of the framing icon (e.g., a mirror portion of the mirror assembly graphic), while preserving the aspect ratio of the video feed and applying other visual effects as desired.

To provide a more specific, albeit non-limiting example, embodiments of the work vehicle multi-camera vision system may include a right, central, and left rear vehicle camera; the terms "right," "central," and "left" defined relative to the orientation of an operator when seated in the operator station (e.g., cabin) of the work vehicle in a forward-facing position. The camera (live video) feeds captured by the right, central, and left rear cameras are presented in the designated gallery display areas of the framing graphics or icons, which may be visually depicted as a right vehicle-external rearview mirror assembly icon, a central vehicle-internal rearview mirror assembly icon, and a left vehicle-external rearview mirror assembly icon, respectively. The rearview mirror assembly icons may be generalized in embodiments; that is, depicted in a generic manner universally reminiscent of passenger vehicle mirror assemblies. Alternatively, the mirror assembly icons or graphics may be imparted with a more specific appearance tailored to the particular type of work vehicle into which the multi-camera vision system is integrated. Again, a mirror (reverse image) effect may applied to the camera feeds when presented in the gallery display areas (mirror portions) of the rearview mirror assembly icons. Further, in certain embodiments, the mirror assembly icons and/or the gallery display areas may correspond to interactive elements of a Graphical User Interface (GUI), with an operator able to select a particular camera feed (and perhaps perform other function) by selecting such GUI elements utilizing a cursor device or touch input.

In the above-described manner, a highly intuitive multi-camera display is thus created enabling an operator of a work vehicle to readily appreciate the availability of multiple (e.g., rear) camera feeds, to simultaneously monitor the content of each camera feed, to intuitively determine which camera feed is currently presented on the main display area, and to quickly switch the camera feed presented on the main display area by, for example, interacting with the framing icons (e.g., rearview mirror assembly icons) or the gallery display areas contained therein. As a still further benefit, in some implementations of the multi-camera vision system, the controller may generate visual alerts on the multi-camera display device (e.g., via modifications to the appearance of a particular framing icon and/or its corresponding gallery display area) directing operator attention to a particular camera feed when the camera feed is not selected for presentation within the main display area of the multi-camera display. Additional description in this regard is provided below in conjunction with FIG. 7.

An example embodiment of the work vehicle multi-camera vision system will now be discussed in connection with FIGS. 1-7. For the purposes of explanation, the following example focuses on a particular type of work vehicle (a wheeled loader) equipped with three rear cameras, the live video feeds of which are presented on an example multi-camera display. The following description notwithstanding, it is emphasized that embodiments of the multi-camera vision system can be utilized in conjunction with various different types of work vehicles; and, further, that the vehicle cameras can capture views of any portions or regions of the environment surrounding or adjacent a work vehicle. Further, description of the manner in which the multi-camera display and the associated GUI appears in the illustrated example is provided purely by way of non-limiting illustration; noting that the "look and feel" of the GUI and the multi-camera display will inevitably vary among embodiments and may be customizable to customer or operator preferences.

Example Work Vehicle Multi-Camera Vision System

Figure 2:
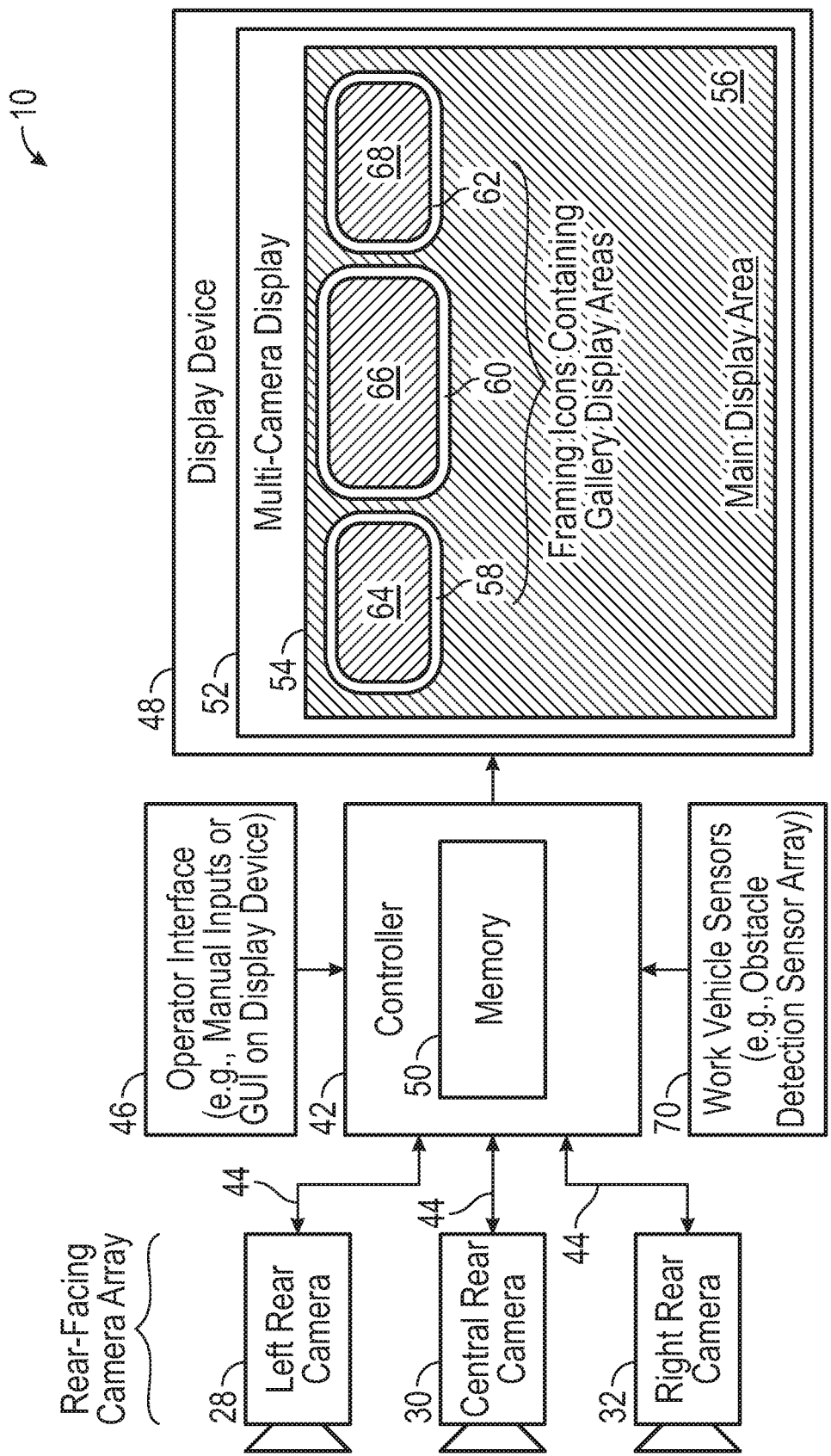
FIG. 2 is a schematic of the example multi-camera vision system deployed onboard the work vehicle shown in FIG. 1.

Referring jointly to FIGS. 1 and 2, an example embodiment of a multi-camera vision system 10 is presented. The example multi-camera vision system 10 is illustrated as integrated into a particular type of work vehicle, here a wheeled loader 12, to provide a non-limiting context in which embodiments of the present disclosure may be better understood. The wheeled loader 12 includes a chassis 14 supported by four ground-engaging wheels 16 and upon which an operator station or cabin 18 is positioned. The example wheeled loader 12 further includes a front bucket 20 mechanically linked to a forward portion of the chassis 14 by a boom assembly 22. Further shown are various other features of the wheeled loader 12 including an engine bay and surrounding infrastructure 24, as well as four wheel fenders 26.

The example multi-camera vision system 10 includes three rear vehicle cameras 28, 30, 32 arranged in an array, the positioning of which is generally indicated in FIG. 1 by camera icons (enlarged for visual clarity). As generically illustrated, the vehicle camera 28 may be mounted to a leftmost portion of the wheeled loader 12, such as on or adjacent the wheel fender 26 of the left rear wheel 16 of the loader 12; the vehicle camera 30 may be mounted to a central portion of the wheeled loader 12, such as above the engine bay 24; and the vehicle camera 32 may be mounted to a rightmost portion of the wheeled loader 12, such as on or adjacent the wheel fender 26 of the right rear wheel 16. As noted above, the terms "left," "central," and "right" are defined relative to the orientation of an operator when seated in the cabin 18 and facing in a forward direction. Given the relative positioning of the rear vehicle cameras 28, 30, 32, the camera 28 mounted to the leftmost portion of the wheeled loader 12 is referred to hereafter as the "left rear vehicle camera 28." The camera 28 more centrally mounted to the wheeled loader 12 is referred to as the "central rear vehicle camera 30." Finally, the camera 32 mounted to the rightmost portion of the wheeled loader 12 is referred to as the "right rear vehicle camera 32." The rear vehicle cameras 28, 30, 32 have generally conical FOVs 34, 36, 38, respectively, which overlap or coincide in regions 40.

As indicated in the schematic of FIG. 1, the left rear vehicle camera 28 and the right rear vehicle camera 32 may be angled outwardly away from the body of the wheeled loader 12 to provide the camera array 28, 30, 32 with a broader (wider angle) FOV. The illustrated positioning and angular orientation of the vehicle cameras 28, 30, 32 and the FOVs 34, 36, 38 is provided merely by way of example. In other embodiments, the vehicle cameras 28, 30, 32 may be otherwise positioned, may have other (e.g., broader angle) individual FOVs, or a different number of cameras may be present, providing at least two vehicle cameras are included in embodiments of the multi-camera vision system 10. Further, while primarily described below as video cameras capturing imagery falling within the visible band of the electromagnetic spectrum, other types of imaging devices (e.g., infrared cameras) can also be integrated into the multi-camera vision system 10 in alternative implementations, with the imagery captured by such devices presented on the below-described multi-camera display accordingly.

The rear vehicle cameras 28, 30, 32 are operably coupled to (that is, in signal communication with) a controller 42 further included in the multi-camera vision system 10 (FIG. 2). The connections between the rear vehicle cameras 28, 30, 32 and the controller 42 are represented by signal communication lines 44, which may represent either wireless or wired data connections. Further, as indicated by the manner in which both ends of the communication lines 44 terminate in arrows, the controller 42 may not only receive video-containing signals or feeds from the rear vehicle cameras 28, 30, 32, but the controller 42 may also provide command signals to the rear vehicle cameras 28, 30, 32 in certain embodiments, as further described below.

The multi-camera display system 10 further includes an operator interface 46 coupled to the controller 42. As generically illustrated in FIG. 2, the operator interface 46 can be any device or group of devices utilized by an operator to input data into or otherwise control the multi-camera vision system 10. In various implementations, the operator interface 46 may be integrated into or otherwise associated with the below-described display device 48. In this regard, the operator interface 46 may include physical inputs (e.g. buttons, switches, dials, or the like) located on or proximate the display device 48, a touchscreen module integrated into the display device 48, or a cursor input device (e.g., a joystick, trackball, or mouse) for positioning a cursor utilized to interface with GUI elements generated on the display device 48, as further described below. It should be understood that the operator interface 46, then, may include any number and type of operator input devices for receiving operator input commands including devices for interacting with GUIs, for receiving verbal input or voice commands, and/or for recognizing operator gesture commands, to list but a few examples.

The controller 42 of the multi-camera vision system 10 can assume any form suitable for performing the functions described throughout this document. Further, the term "controller," as appearing herein, is utilized to generally refer to the processing architecture of multi-camera vision system 10. The controller 42 can encompass or may be associated with any practical number of processors (central and graphical processing units), control computers, navigational equipment pieces, computer-readable memories, power supplies, storage devices, interface cards, and other standardized components. The controller 42 may also include or cooperate with any number of firmware and software programs or computer-readable instructions designed to carry-out the various process tasks, calculations, and control/display functions described herein. Such computer-readable instructions may be stored within a non-volatile sector of a memory 50 associated with the controller 42. While generically illustrated in FIG. 2 as a single block, the memory 50 can encompass any number and type of storage media suitable for storing computer-readable code or instructions, as well as other data utilized to support the operation of the multi-camera vision system 10. The memory 50 may be integrated into the controller 42 in embodiments as, for example, a system-in-package, a system-on-a-chip, or another type of microelectronic package or module.

With continued reference to FIG. 2, an output of the controller 42 is coupled to an input of the display device 48. During operation of the multi-camera vision system 10, the controller 42 provides video output signals to display device 48 to generate a multi-camera display 52 on a screen 54 of the display device 48. In the illustrated schematic, and as discussed in detail below, the controller 42 generates the multi-camera display 52 to include a main display area 56; a number of framing icons (here, three framing icons 58, 60, 62); and a corresponding number of gallery display areas (here, three gallery display areas 64, 66, 68). The framing icons 58, 60, 62 and the gallery display areas 64, 66, 68 may be spaced along an upper strip or region of the multi-camera display 52, as indicated. For example, in embodiments, the framing icons 58, 60, 62 and the gallery display areas 64, 66, 68 may be superimposed over an upper portion of the main display area 56. Alternatively, the framing icons 58, 60, 62 and the gallery display areas 64, 66, 68 may be displayed adjacent (e.g., immediately above) the main display area 56; or, instead, the framing icons 58, 60, 62 and the gallery display areas 64, 66, 68 may be displayed in a first window, while the main display area 56 is displayed in a second window. In various other embodiments, alternative dispositions of the framing icons 58, 60, 62 and the gallery display areas 64, 66, 68 may be utilized and, perhaps, may be customizable to operator or customer preference. Generally, the main display area 56 will occupy at least a majority, if not the substantial entirety of the display screen 54 of the display device 48, while the gallery display areas 64, 66, 68 (taken cumulatively) occupy a lesser portion of the main display area 56 than does the main display area 56. The framing icons 58, 60, 62 may be substantially identical in appearance and displayed size; or, instead, may vary in appearance and size, as described more fully below.

The display device 48 may be affixed to the static structure of the operator cabin 18 and realized in a head-down display (HDD) configuration in embodiments. In other embodiments, the display device 48 can assume the form of a portable electronic display device, such as a tablet computer or laptop, which is carried into the operator station (e.g., the cabin 18 of the wheeled loader 12) by an operator and which communicates with the various other components of the work vehicle multi-camera vision system 10 over a physical connection or wireless connection to perform the below-described display functionalities. The controller 42 may also receive various other sensor data, depending upon implementation, as utilized in the generation of the multi-camera display 52. For example, and as further schematically shown in FIG. 2, the multi-camera vision system 10 can include other work vehicle sensors 70, including distance measuring equipment (DME) or sensor arrays (e.g., laser, millimeter wavelength radar, or sonar (ultrasound) sensor arrays) for detecting obstacles in the FOVs of the rear vehicle cameras 28, 30, 32.

Figure 3:
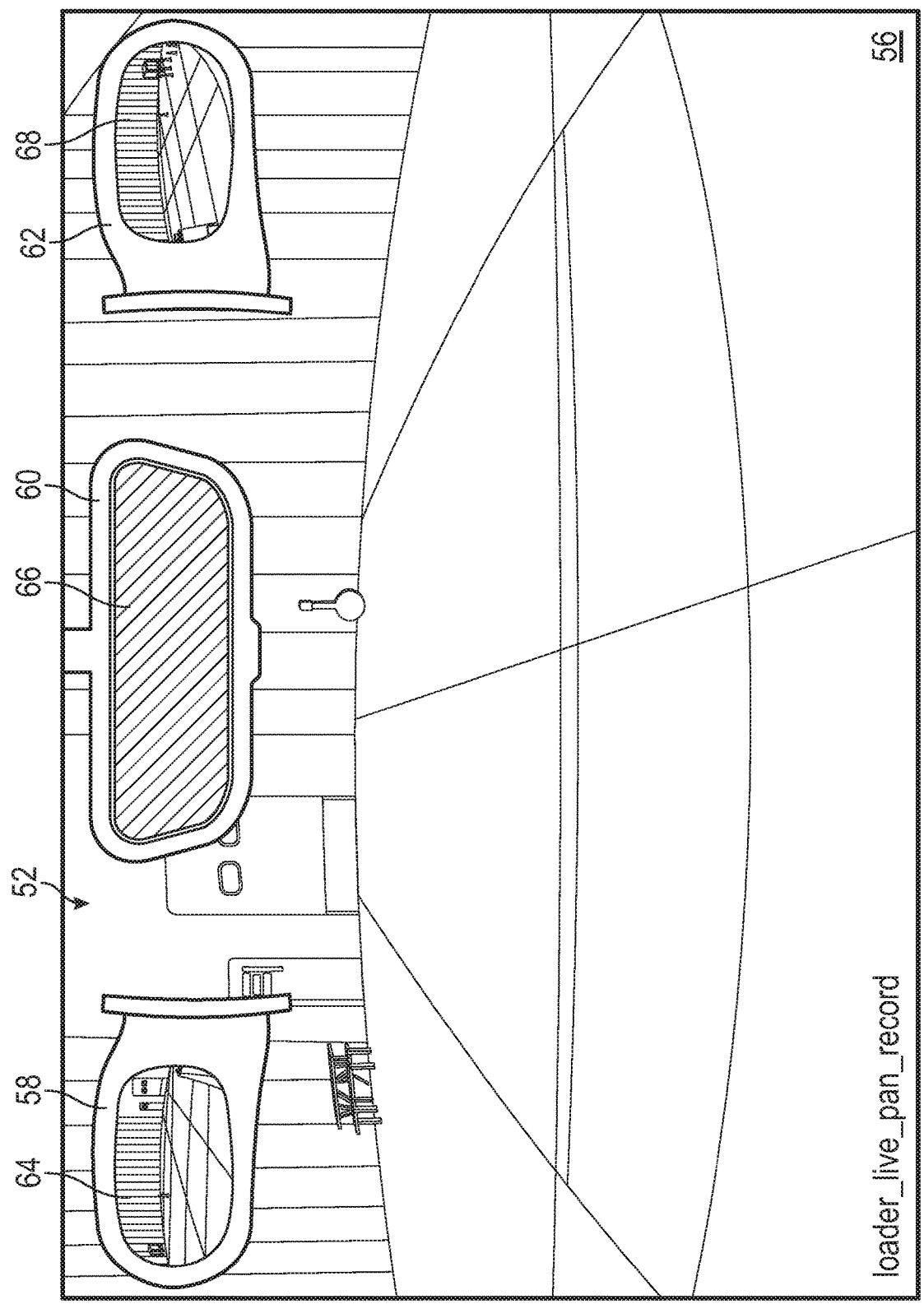
FIGS. 3-5 are screenshots of an example multi-camera display generated by the multi-camera vision system shown in FIGS. 1-2, which illustrate the multi-camera display when a central rear camera feed is the currently-selected camera feed (FIG. 3), when a left rear camera feed is the currently-selected camera feed (FIG. 4), and when a right rear camera feed is the currently-selected camera feed (FIG. 5)
Figure 4:
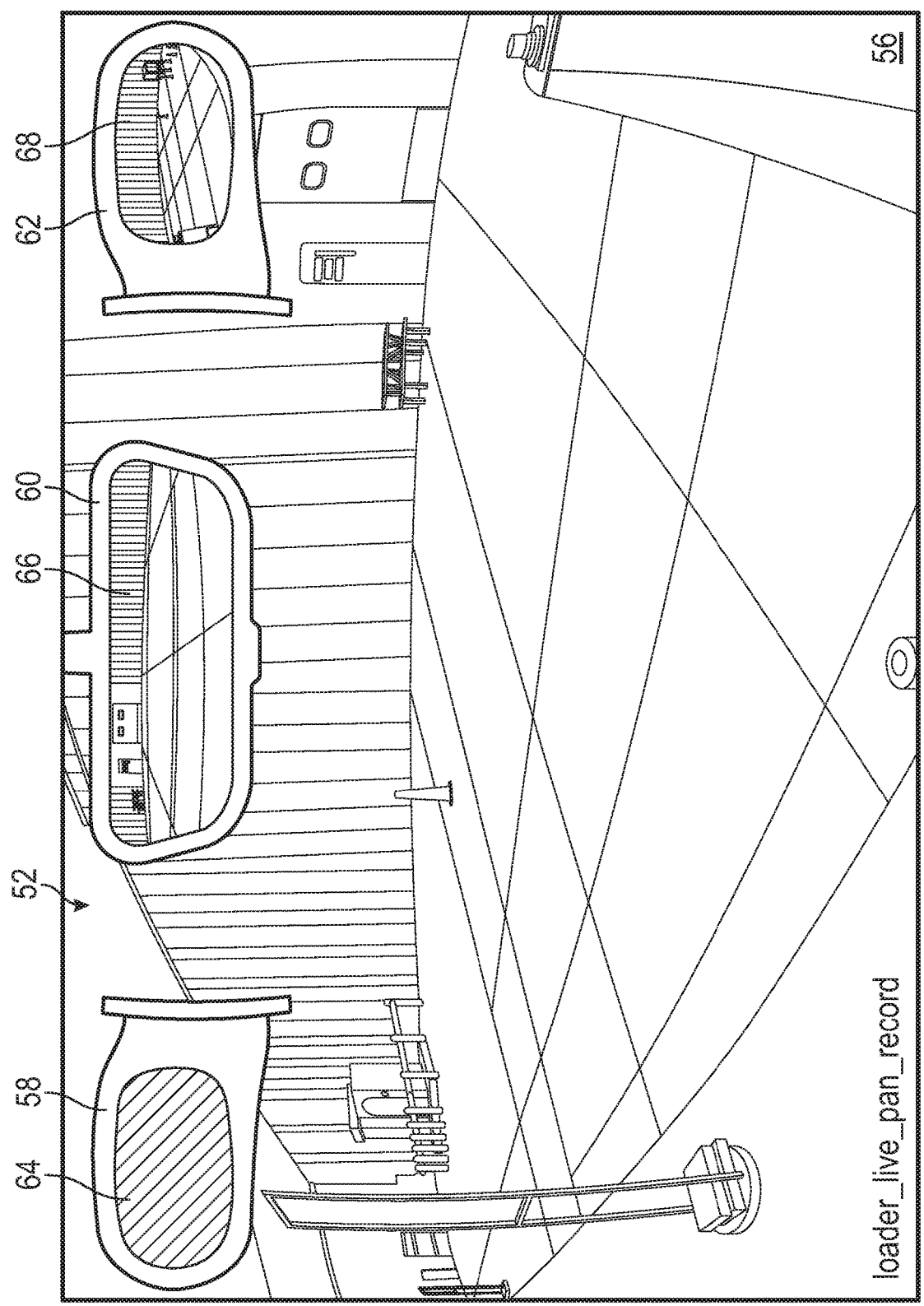
Figure 5:
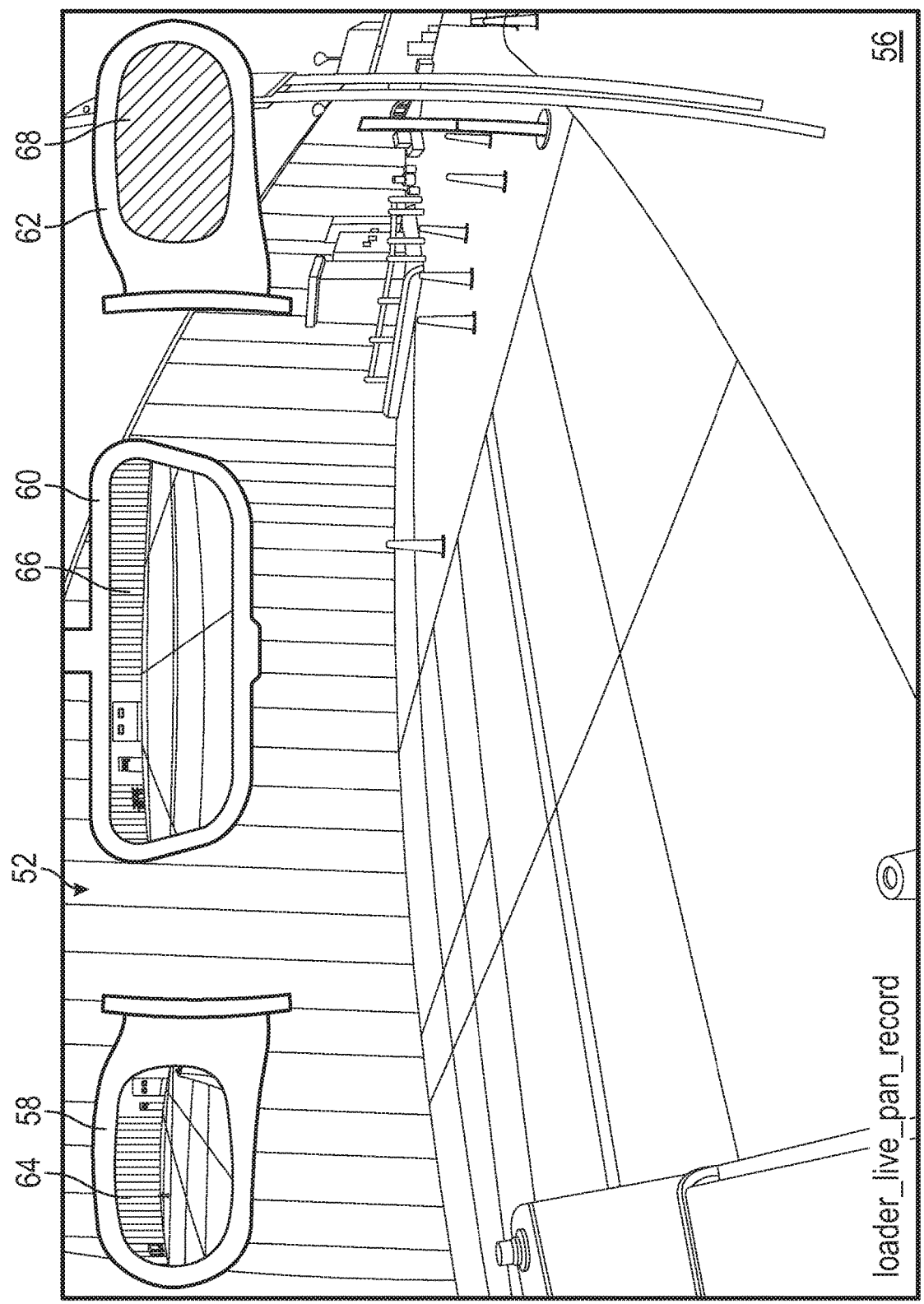

Referring now to FIGS. 3-5, screenshots of the multi-camera display 52 are presented by way of example implementation, with reference numerals carried-over from FIG. 2 where appropriate. Here, it can be seen that the framing icons 58, 60, 62 are generated as icons or simplified graphical representations of vehicle rearview mirror assemblies. More specifically, the framing icon 58 is graphically produced or depicted as a left vehicle-external rearview mirror assembly (alternatively referred to as a left "side view," "door," or "wing" mirror assembly) and is consequently referred to as the "left rearview mirror assembly icon 58." Similarly, the framing icon 62 is graphically produced as right vehicle-external rearview mirror assembly (alternatively referred to as a right "side view," "door," or "wing" mirror assembly) and is consequently referred to as the "right rearview mirror assembly icon 62." Finally, the framing icon 60 is graphically produced or depicted as a central vehicle-interior rearview mirror assembly and is consequently referred to as the "central rearview mirror assembly icon 60." The mirror assembly icons or graphics 58, 60, 62 are generalized in the illustrated example (that is, depicted in a generic manner reminiscent of passenger vehicle mirror assemblies) for rapid visual comprehension and universality. In further embodiments, the mirror assembly icons 58, 60, 62 may be imparted with an appearance more specifically tailored to the look of the wheeled loader 12; e.g., if the wheeled loader 12 includes mirror assemblies, the mirror assembly icons 58, 60, 62 may be imparted with an appearance matching the mirror assemblies of the wheeled loader 12.

The mirror assembly icons 58, 60, 62 may be spaced or arranged in a row, which is superimposed a top region of the main display area 56 as shown. Such a spatial distribution of the mirror assembly icons 58, 60, 62 generally corresponds to the position of real-world vehicular rearview mirror assemblies and, therefore, further aids in rapid visual comprehension by an operator when merely glancing at the multi-camera display 52. This benefit in rapid comprehension notwithstanding, the spatial positioning of the mirror assembly icons 58, 60, 62 can vary among embodiments; e.g., in alternative implementations, the mirror assembly icons 58, 60, 62 may be spaced in a row appearing at the bottom of the multi-camera display 52 or, perhaps, spaced in a column appearing at left or right portion of the display 52.

The camera feed captured by the left rear vehicle camera 28 (here, the "left rear camera feed") is presented in the display gallery area 64 contained in the left mirror assembly icon 58, at least when this camera feed is not selected for presentation within the main display area 56. Similarly, the camera feed captured by the right rear vehicle camera 32 (herein, the "right rear camera feed") is presented in the display gallery area 68 contained in the right mirror assembly icon 62 (again, at least when this camera feed is not selected). Finally, the camera feed captured by the central rear vehicle camera 30 (herein, the "central rear camera feed") is presented in the display gallery area 66 contained in the central mirror assembly icon 60, at least when this camera feed is not selected for presentation within the main display area 56. The controller 42 may modify the rear camera feeds (e.g., by scaling, cropping, masking, or the like) to fit the content camera feeds into the gallery display areas 64, 66, 68 appearing within the mirror assembly icons 58, 60, 62. Further, to more accurately simulate or mimic the view through real-world vehicle mirror assemblies, the controller 42 also applies a mirror effect (reverse image effect) to the rear camera feeds when reproducing the camera feeds within the gallery display areas 64, 66, 68.

Referring now specifically to FIG. 3, in this example scenario, the central rear camera feed captured by the central rear vehicle camera 30 is presently selected and, therefore, presented (displayed or generated) in the main display area 56 of the multi-camera display 52. This is indicated visually by the multi-camera display 52 by alerting or modifying the appearance of the gallery display region 66 and/or the appearance of the central vehicle rearview mirror assembly icon 60 in a predefined manner. For example, as illustrated, display of the central rear camera feed captured by the central rear vehicle camera 30 in the gallery display area 66 may be temporarily suspended or suppressed (ceased), suppressed, or visually obstructed in some manner. In this regard, another opaque or semi-opaque graphic or fill effect may be produced over the camera feed within the display area 66. Further, if desired, the graphic or effect color coded to a predefined informational color (e.g., green or blue) as indicated in FIG. 3 by a first cross-hatch pattern. Concurrently, the left and right camera feeds provided by the rear vehicle cameras 28, 32 are presented in their corresponding gallery display areas 64, 68 within the mirror assembly icons 58, 62. In this manner, an operator need only glance at the multi-camera display 52 to determine which camera feed is currently presented for primary or principal display within the main display area 56. Further, the selected camera feed is presented in a relatively large display area for visual clarity, while the other camera feeds (in this example, the camera feeds captured by the left rear vehicle camera 28 and the right rear vehicle camera 32) remain visible on the multi-camera display 52 concurrently presented to maintain operator awareness of the content of the available camera feeds.

The operator may interact with the multi-camera vision system 10 utilizing the operator interface 46 in any desired manner. For example, in certain embodiments, a GUI may be integrated into the multi-camera display 52, with various interactive visual elements or widgets presented on the screen of the display device 48 and integrated into the display 52 (which can be manipulated by the operator by touch input or utilizing a cursor device). To provide a more specific example, an operator may interact with GUI elements integrated into the multi-camera display 52 (e.g., either the gallery display area 64 or the left mirror assembly icon 58) to select the camera feed captured by the left rear vehicle camera 28 for presentation within the main display area 56. In response to the receipt of such operator input, the controller 42 then switches the camera feed captured by the left rear vehicle camera 28 to presentation in the main display area 56 of the multi-camera display 52. Such a scenario is indicated by transitioning from FIG. 3 to FIG. 4. With the feed captured by the left rear vehicle camera 28 now presented in the main display area 56, the gallery display area 64 is then visually modified (e.g., rendered opaque or semi-opaque and color coded) as described above. Additionally, the central rear camera feed captured by the central rear vehicle camera 30 returns to display within the gallery display area 66 (the mirror portion of the mirror assembly graphic) appearing within the central mirror assembly icon 60.

In a like manner, and referring now to FIG. 5, if the operator selects the gallery display area 68 and/or the right mirror assembly icon 60, the camera feed provided by the right rear vehicle camera 32 is then designed by the controller 42 as the newly-selected camera feed; that is, the camera feed selected for primary presentation in the main display area 56. Correspondingly, the other camera feeds captured by the rear vehicle cameras 28, 30 become the non-selected camera feeds at this juncture in time. Now selected for primary presentation, the right rear camera feed received from the right rear vehicle camera 32 is scaled-upward in size and fit into the main display area 56. Further, the gallery display area corresponding to or designated for presentation of the right rear camera feed (i.e., the gallery display area 68) is altered in appearance (e.g., rendered opaque or semi-opaque and possibly color coded, as described above), while the camera feeds received from the left rear vehicle camera 28 and central rear vehicle camera 30 are concurrently presented in the gallery display areas 64, 66 within the mirror assembly icons 58, 60. Again, operator selection data may be received via touch input (if the display device 48 is provided with touch capabilities), by GUI cursor selection, by usage of a manual input, or in any other suitable manner.

In the above described manner, the example multi-camera vision system 10 presents a currently-selected camera feed in a main or primary display area of a multi-camera display 52, while concurrently presenting the non-selected camera feed(s) in the gallery display areas 64, 66, 68 of the display 52. This enables an operator to select a particular camera (live video) feed for principal viewing within the main display area 56, while maintaining visual awareness of the content simultaneously captured by the other, non-selected camera feeds. Further, in embodiments which the multi-camera vision system 10 alters the visual appearance of the gallery display area (or the framing icon) corresponding to the currently-selected camera feed, an operator may rapidly determine which of the camera feeds is currently selected (and, therefore, presented in an enlarged format within the main display area 56) at a glance. As a further advantage, embodiments of the multi-camera vision system 10 enable an operator to quickly and intuitively navigate between available camera feeds (that is, switch the camera feed that is presently selected and presented in the main display area 56) through the provision of operator input entered via a suitable interface and, in certain cases, through on-screen interactions with the vehicle rearview mirror assembly icons 58, 60, 62 and/or the gallery display areas 64, 66, 68 when serving as interactive GUI elements. Upon startup of the multi-camera vision system 10, the controller 42 may be programmed to present the last-selected camera feed for initial presentation in the main display area 56; or, instead, may initially present a default camera feed (e.g., the central rear camera feed captured by the central rear vehicle camera 30) within the main display area 56 of the multi-camera display 52.

Additional functionalities may be provided in further embodiments of the multi-camera vision system 10. For example, in certain embodiments, an operator may be able to interact with GUI display elements of the multi-camera display 52 to modify operational aspects of the rear vehicle cameras 28, 30, 32. In such embodiments, the controller 42 may be configured to monitor for receipt of operator input via the operator interface 46 modifying an operational aspect of any selected one of the rear vehicle cameras 28, 30, 32. The modified operational aspect can be, for example, alterations to any operational property of the rear vehicle cameras 28, 30, 32 that is controllable by an operator or user; adjustments to the orientation of the cameras 28, 30, 32 if movable by an actuator; or any other adjustments that can be remotely implemented to the rear vehicle cameras 28, 30, 32. Further, in various embodiments, such operator input may be entered via on-screen interactions with GUI elements appearing on the multi-camera display 52 when the framing icons (here, the vehicular mirror assembly icons 58, 60, 62), the gallery display areas (here, the mirror portions 64, 66, 68 of the icons 58, 60, 62), or a combination thereof server as interactive graphical elements. As a more specific example, at least a first of the vehicle cameras may be operable in a plurality of modes, such as a day (default) mode, a night (low light) mode, and perhaps other (e.g., infrared) modes. In such embodiments, the operator input may specify which of the plurality of modes the first vehicle camera desirably operates, as described in the following paragraph.

Figure 6:
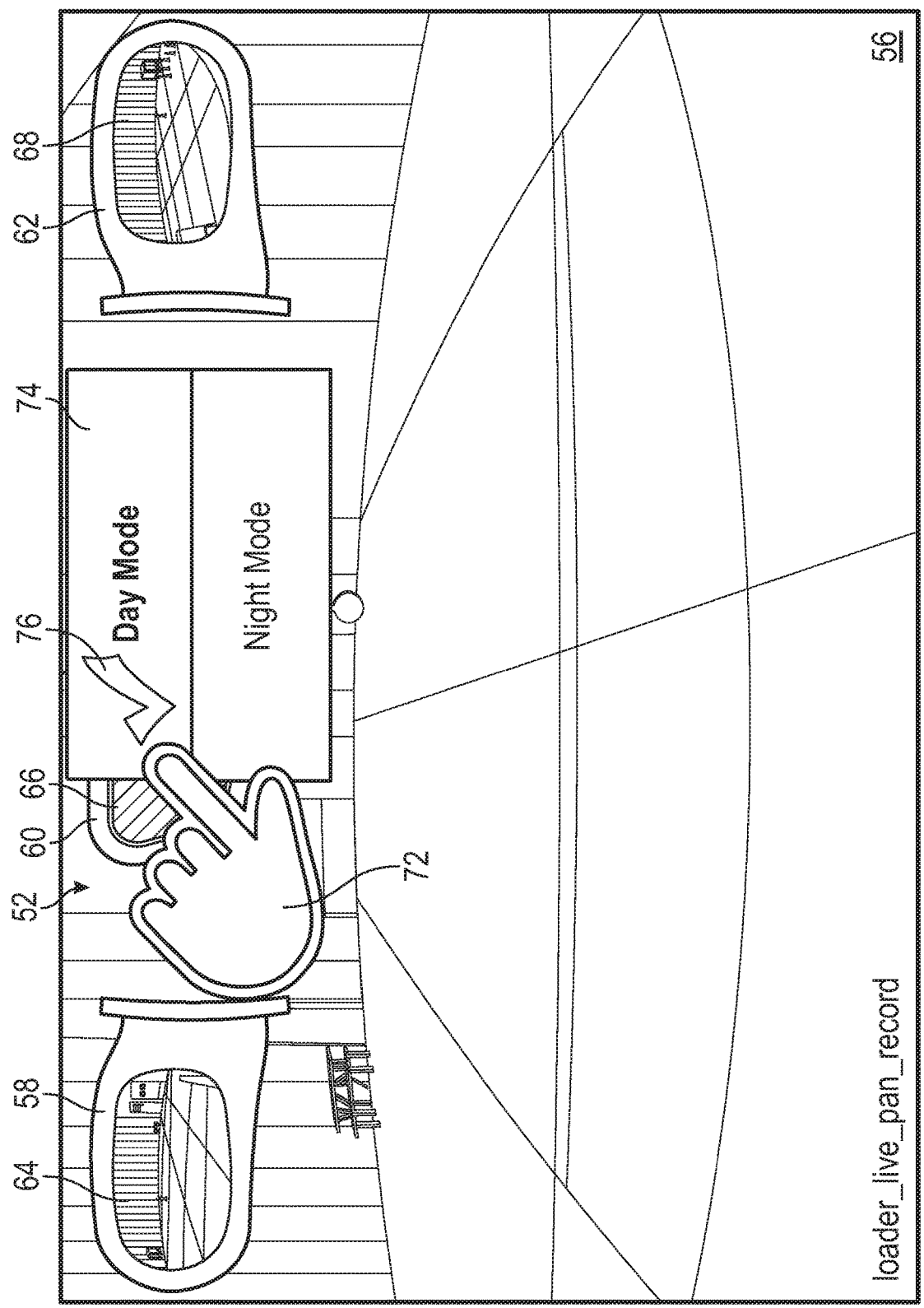
FIG. 6 is a screenshot of the example multi-camera display shown in FIGS. 3-5 illustrating one manner in which an operator may interact with graphical user interface (GUI) elements (here, a central framing icon and/or the gallery display area therein) to control a functionality of the corresponding vehicle camera.

The above-mentioned possibility is further illustrated in FIG. 6, in which a hand icon 72 is representative of touch input or cursor input selecting the central vehicular rearview mirror assembly icon 60 or, perhaps, the gallery display area 66 contained therein. Such input summons a GUI window 74 containing virtual checkboxes or other interactive elements, which permit operator selection between at least two operational modes (here, a day mode or a night (low light) mode) in which to place the corresponding vehicle camera (here, the central rear vehicle camera 30). In this example, the central rear vehicle camera 30 presently operates in the day mode (as indicated by checkmark graphic 76), but can be placed in the night (low light) mode via selection of the lower option; e.g., by touching or using a cursor input to select the lower half of the window 74. This operator input (a second type of operator input) is distinguishable from the operator input (a first type of operator input) utilized to select the central rear camera feed for presentation in the main display area 56. For example, in the case of cursor input, the GUI window 74 may be summoned by right clicking an input device or hovering a cursor over the icon 60 or area 66 for a predetermined time period on the order of 1-2 seconds. Similarly, in the case of touch input, the window 74 may be summoned by double tapping; or, perhaps, by touching and then maintaining contact with the icon 60 or area 66 for a predetermined time period. When receiving operator input to switch the operational mode of a camera (e.g., the central rear vehicle camera 30) in this manner, the controller 42 transmits a corresponding command signal to the appropriate camera instructing the camera to switch into operation in the newly-selected modality.

In still other embodiments, the multi-camera vision system 10, and specifically the controller 42, may determine when operator attention is desirably directed to a non-selected vehicle camera feed; and, when so determining, perform certain actions. For example, when determining that operator attention is desirably directed to a non-selected vehicle camera feed, the controller 42 may generate a visual alert or advisory on the multi-camera display 52 identifying the non-selected vehicle camera feed and indicating that a non-selected vehicle camera feed warrants operator attention. The controller 42 may determine that a particular non-selected camera feed warrants attention when, for example, the following conditions are satisfied: (i) an obstacle is detected by the obstacle detection sensors (included in the sensors 70) within a predetermined distance from the wheeled loader 12 (e.g., a distance of a few feet or meters), and (ii) the controller 42 further determines that the non-selected camera feed provides a superior view of (e.g., more closely centered on) the detected obstacle than does the currently-selected vehicle camera feed presented in the main display area 56. The visual alert can assume many forms including, for example, a text annunciation generated on the main display area 56. In one useful approach, such a visual alert is generated by altering an appearance of the non-selected vehicle camera feed (as displayed in its designated gallery display area 64, 66, 68) in which the detected obstacle is best observed, the framing icon surrounding this vehicle camera feed, or a combination thereof.

Continuing the description from the foregoing paragraph, consider the example scenario shown in FIG. 7. In this case, the controller 42 has determined that an obstacle (e.g., a lamppost 78) is detected generally to the rear of the wheeled loader 12 based, at least in part, on data received from the sensors 70; although image recognition of the cameras feed provided by the cameras 28, 30, 32 can also be utilized for obstacle detection purposes in embodiments, if practical and adequately responsive. The detected obstacle (the lamppost 78) is located in relatively close proximity to the rear of the wheeled loader 12 and, therefore, within a preestablished warning zone. Further, the detected obstacle (the lamppost 78) is located in a zone or region to the rear of the wheeled loader 12 corresponding to the right rear vehicle camera feed. Ascertaining as much, the controller 42 further establishes that the right rear vehicle camera feed is not the currently-selected camera feed and, therefore, is not currently presented in the main display area 56. Accordingly, in the illustrated example, the controller 42 concludes that a visual alert or warning is properly generated on the multi-camera display 52, and controller 42 generates such an alert accordingly.

To optimize display clarity and intuitiveness, the visual alert may be generated, at least in part, by alerting the appearance of the right vehicle rearview mirror assembly icon 62 in a predetermined manner. For example, and as indicated in FIG. 7 by a second cross-hatch pattern, the mirror assembly icon 62 can be rendered in a warning or caution color (e.g., red or yellow) in accordance with a pre-established color coding scheme. Additionally or alternatively, an animation effect may be applied to the mirror assembly icon 62, such as flashing indicated by lines 80 (only a few of which are labeled in FIG. 7). In other embodiments, the mirror assembly icon 62 and the right rear vehicle camera feed presented in the display area 68 may be enlarged or otherwise rendered more visually striking; or various other types of visual alerts may be generated on the multi-camera display 52. Such alerts may be graded in embodiments, with the alerts increasing in urgency as the distance between the detected obstacle and the wheeled loader 12 decreases. Further, if desired (e.g., when generating a higher level alert), audible or haptic alerts may be generated in combination with the visual alert generated on the multi-camera display 52.

Enumerated Examples of the Work Vehicle Multi-Camera Vision System

The following examples of the work vehicle multi-camera vision system are further provided and numbered for ease of reference.

1. A multi-camera vision system is disclosed, which is utilized onboard a work vehicle having an operator station. In embodiments, the multi-camera vision system includes a display device utilized within the operator station of the work vehicle; vehicle cameras providing vehicle camera feeds of the work vehicle's surrounding environment, as captured from different vantage points; and a controller operably coupled to the vehicle cameras and to the display device. The controller is configured to: (i) generate, on the display device, a multi-camera display including framing icons, gallery display areas within the framing icons, and a main display area; (ii) identify a currently-selected vehicle camera feed and one or more non-selected vehicle camera feeds from the multiple vehicle camera feeds; and (iii) present the currently-selected vehicle camera feed in the main display area of the multi-camera display, while concurrently presenting the one or more non-selected vehicle camera feeds in a corresponding number of the gallery display areas.

2. The multi-camera vision system of example 1, wherein the controller is further configured to generate the framing icons as vehicle mirror assembly icons having mirror portions. Further, the mirror portions of the vehicle mirror assembly icons serve as the gallery display areas such that the controller generates the one or more non-selected vehicle camera feeds in the mirror portions corresponding thereto.

3. The multi-camera vision system of example 2, wherein the controller is further configured to apply a reverse image effect when generating the one or more non-selected vehicle camera feeds in the mirror portions.

4. The multi-camera vision system of example 2, wherein the controller is further configured to: (i) determine which of the framing icons corresponds to the currently-selected work vehicle camera feed; and (ii) when so determining, alter an appearance of the framing icon corresponding to the currently-selected work vehicle camera feed.

5. The multi-camera vision system of example 4, wherein, when altering the appearance of the framing icon corresponding to the currently-selected work vehicle camera feed, the controller suppresses display of the currently-selected work vehicle camera feed within the mirror portion of the vehicle mirror assembly icon corresponding to the currently-selected work vehicle camera feed.

6. The multi-camera vision system of example 1, the main display area occupies a greater portion of the multi-camera display than does the gallery display areas, taken cumulatively.

7. The multi-camera vision system of example 1, wherein the framing icons are arranged in a row and spaced across an upper portion of the multi-camera display.

8. The multi-camera vision system of example 1, wherein the vehicle cameras include: a left rear vehicle camera providing a left rear vehicle camera feed to the controller; a right rear vehicle camera providing a right rear vehicle camera feed to the controller; and a central rear vehicle camera providing a central rear vehicle camera feed to the controller.

9. The multi-camera vision system of example 8, wherein the framing icons include: a left vehicle-external rearview mirror icon in which the left rear vehicle camera feed is produced when not selected for presentation in the main display area; a right vehicle-external rearview mirror icon in which the right rear vehicle camera feed is produced when not selected for presentation in the main display area; and a central vehicle-internal rearview mirror icon in which the central rear vehicle camera feed is produced when not selected for presentation in the main display area.

10. The multi-camera vision system of example 1, wherein the controller is further configured to identify the currently-selected vehicle camera feed based, at least in part, on operator interaction with a graphical user interface in which the framing icons, the gallery display areas, or a combination thereof are interactive graphical elements.

11. The multi-camera vision system of example 1, wherein the controller is further configured to: (i) monitor for receipt of operator input modifying an operational aspect of a first vehicle camera included in the vehicle cameras, the operator input received via a graphical user interface in which the framing icons, the gallery display areas, or a combination thereof are interactive graphical elements; and (ii) modifying the operational aspect of the first vehicle camera in accordance with the operator input when received at the controller.

12. The multi-camera vision system of example 11, wherein the first vehicle camera is operable in a plurality of modes. Additionally, the operator input specifies an operational mode in which to place the first vehicle camera.

13. The multi-camera vision system of example 1, wherein the controller is further configured to: (i) determine when operator attention is desirably directed to a first non-selected vehicle camera feed included in the one or more non-selected vehicle camera feeds and appearing within a first framing icon included in the framing icons; and (ii) when so determining that operator attention is desirably directed to the first non-selected vehicle camera feed, altering an appearance of the first non-selected vehicle camera feed, the first framing icon, or a combination thereof.

14. The multi-camera vision system of example 13, further including obstacle detection sensors coupled to the controller. Further, the controller determines when operator attention is desirably directed to the first non-selected vehicle camera feed when: (i) an obstacle is detected by the obstacle detection sensors within a predetermined distance from the work vehicle, and (ii) the first non-selected camera feed provides a better view of the detected obstacle than does the currently-selected vehicle camera feed.

15. In further embodiments, the multi-camera vision system includes a display device utilized within the operator station of the work vehicle; a first vehicle camera providing a first vehicle camera feed of the work vehicle's surrounding environment, as captured from a first vantage point; a second vehicle camera providing a second vehicle camera feed of the work vehicle's surrounding environment, as captured from a second vantage point different than the first vantage point; and a controller coupled to the first vehicle camera, to the second vehicle camera, and to the display device. The controller is configured to: (i) generate, on the display device, a multi-camera display including a main display area, a first gallery display area, and a second gallery display area; (ii) determine when an operator selects a new camera feed for primary presentation on the main display area; (iii) switch presentation of the first video camera feed from the first gallery display area to the main display area when the first video camera feed is selected for primary presentation; and (iv) switch presentation of the second video camera feed from the second gallery display area to the main display area when the second video camera feed is selected for primary presentation.

CONCLUSION

The foregoing has thus disclosed embodiments of a work vehicle multi-camera vision system. In various embodiments, the multi-camera vision system presents a currently-selected camera feed in a main display area of a multi-camera display, while concurrently presenting the non-selected camera feed(s) in the gallery display areas of the display. This enables an operator to select a particular view for principal viewing, while maintaining visual awareness of the content simultaneously captured within the other camera feeds. Further, in embodiments which the multi-camera vision system alters the visual appearance of the gallery display area (or the framing icon) corresponding to the currently-selected camera feed, an operator may rapidly determine which of the camera feeds is currently selected and, therefore, presented in an enlarged format within the main display area at a glance. As a further advantage, embodiments of the vision system enable an operator to quickly and intuitively navigate between camera feeds (that is, switch the camera feed that is presently selected and therefore presented in the main display area) through the provision of operator input entered via a suitable interface. Such an interface can be physical interface (e.g., buttons or similar manual controls located on or adjacent the display device), a GUI in which the operator switches between the available camera feed by selected the feed in the gallery display area or its framing icon by touch input or cursor input, or in some other manner. Moreover, in certain embodiments, additional camera functionality may be controlled and/or or alerts may be provided through graphical actions of the multi-camera display, as discussed in detail above.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A multi-camera vision system utilized onboard a work vehicle having an operator station, the multi-camera vision system comprising:
   a display device utilized within the operator station of the work vehicle;
   vehicle cameras providing vehicle camera feeds of the work vehicle's surrounding environment, as captured from different vantage points;
   a controller operably coupled to the vehicle cameras and to the display device, the controller having processing architecture including a memory with instructions to:
   generate, on the display device, a multi-camera display including framing icons in the form of vehicle mirror icons having mirror portions, gallery display areas within the mirror portions of the framing icons, and a main display area;

identify a currently-selected vehicle camera feed and one or more non-selected vehicle camera feeds from the multiple vehicle camera feeds;

present the currently-selected vehicle camera feed in the main display area of the multi-camera display, while concurrently presenting the one or more non-selected vehicle camera feeds in a corresponding number of the gallery display areas;

determine which of the framing icons corresponds to the currently-selected work vehicle camera feed; and alter an appearance of the gallery display area within the framing icon corresponding to the currently-selected work vehicle camera feed including suppressing display of the currently-selected work vehicle camera feed within the framing icon corresponding to the currently-selected work vehicle camera feed.

2. The multi-camera vision system of claim 1, wherein the controller generates the one or more non-selected vehicle camera feeds in the mirror portions corresponding thereto.

3. The multi-camera vision system of claim 2, wherein the controller is further configured to apply a reverse image effect when generating the one or more non-selected vehicle camera feeds in the mirror portions.

4. The multi-camera vision system of claim 1, wherein the controller is further configured to:

alter an appearance of the framing icon corresponding to the currently-selected work vehicle camera feed.

5. The multi-camera vision system of claim 1, the main display area occupies a greater portion of the multi-camera display than does the gallery display areas, taken cumulatively.

6. The multi-camera vision system of claim 1, wherein the framing icons are arranged in a row and spaced across an upper portion of the multi-camera display.

7. The multi-camera vision system of claim 1, wherein the vehicle cameras comprise:

a left rear vehicle camera providing a left rear vehicle camera feed to the controller;

a right rear vehicle camera providing a right rear vehicle camera feed to the controller; and a central rear vehicle camera providing a central rear vehicle camera feed to the controller.

8. The multi-camera vision system of claim 7, wherein the framing icons comprise:

a left vehicle-external rearview mirror icon in which the left rear vehicle camera feed is produced when not selected for presentation in the main display area;

a right vehicle-external rearview mirror icon in which the right rear vehicle camera feed is produced when not selected for presentation in the main display area; and a central vehicle-internal rearview mirror icon in which the central rear vehicle camera feed is produced when not selected for presentation in the main display area.

9. The multi-camera vision system of claim 1, wherein the controller is further configured to identify the currently-selected vehicle camera feed based, at least in part, on operator interaction with a graphical user interface in which the framing icons, the gallery display areas, or a combination thereof are interactive graphical elements.

10. The multi-camera vision system of claim 1, wherein the controller is further configured to:

monitor for receipt of operator input modifying a first vehicle camera included in the vehicle cameras, the operator input received via a graphical user interface in which the framing icons, the gallery display areas, or a combination thereof are interactive graphical elements; and modifying the first vehicle camera in accordance with the operator input when received at the controller.

11. The multi-camera vision system of claim 10, wherein the first vehicle camera is operable in a plurality of modes; and wherein the operator input specifies one of the plurality of modes in which to place the first vehicle camera.

12. The multi-camera vision system of claim 1, further comprising obstacle detection sensors coupled to the controller; and wherein the controller is configured to:

determine when an obstacle is detected by the obstacle detection sensors within a predetermined distance from the work vehicle, and when a first non-selected camera feed provides a better view of the detected obstacle than does the currently-selected vehicle camera feed.

13. A multi-camera vision system utilized onboard a work vehicle having an operator station, the multi-camera vision system comprising:

a display device utilized within the operator station of the work vehicle;

a first vehicle camera providing a first vehicle camera feed of the work vehicle's surrounding environment, as captured from a first vantage point;

a second vehicle camera providing a second vehicle camera feed of the work vehicle's surrounding environment, as captured from a second vantage point different than the first vantage point;

a controller coupled to the first vehicle camera, to the second vehicle camera, and to the display device, the controller having processing architecture including a memory with instructions to:

generate, on the display device, a multi-camera display including a main display area, a first gallery display area, and a second gallery display area;

determine when an operator selects a new camera feed for primary presentation on the main display area;

switch presentation of the first video camera feed from the first gallery display area to the main display area when the first video camera feed is selected for primary presentation;

switch presentation of the second video camera feed from the second gallery display area to the main display area when the second video camera feed is selected for primary presentation;

alter an appearance of the first gallery display area when the first video camera feed is selected for primary presentation; and alter an appearance of the second gallery display area when the second video camera feed is selected for primary presentation;

wherein the altering the appearance of the first gallery display area of the first vehicle rearview mirror and the second gallery display area of the second vehicle rearview mirror includes suppressing within the first and second gallery display areas display of the camera feed for primary presentation on the main display area.

14. The multi-camera vision system of claim 13, wherein the controller is further configured to:

present the second video camera feed in the second gallery display area, while the concurrently presenting the first video camera feed in the main display area when the first video camera feed is selected for primary presentation; and present the first video camera feed in the first gallery display area, while the concurrently presenting the second video camera feed in the main display area when the second video camera feed is selected for primary presentation.

15. The multi-camera vision system of claim 13, wherein the first video camera feed is a rear vehicle camera feed; and
wherein the controller is configured to apply a reverse image effect when presenting the first video camera feed in the first gallery display area.

16. The multi-camera vision system of claim 15, wherein the controller is further configured to generate a vehicular mirror assembly icon having a mirror portion in which the first gallery display area presents the first video camera feed when the second video camera feed is selected for primary presentation.

17. A multi-camera vision system utilized onboard a work vehicle having an operator station, the multi-camera vision system comprising:
a display device utilized within the operator station of the work vehicle;
first and second rear vehicle cameras providing first and second rear vehicle camera feeds, as captured from different vantage points, of an environment located generally to the work vehicle's rear;
a controller coupled to the first rear vehicle camera, to the second rear vehicle camera, and to the display device, the controller having processing architecture including a memory with instructions to:
generate, on the display device, a multi-camera display including a first vehicle rearview mirror assembly icon, a second vehicle rearview mirror assembly icon, and a main display area;
identifying a currently-selected camera feed for presentation in the main display area of the multi-camera display;
present the first rear vehicle camera feed in a mirror portion of the first vehicle rearview mirror assembly icon, while concurrently presenting the second rear vehicle camera feed in the main display area when the second rear vehicle camera feed is identified as the currently-selected camera feed;
present the second rear vehicle camera feed in a mirror portion of the second vehicle rearview mirror assembly icon, while concurrently presenting the first rear vehicle camera feed in the main display area when the first rear vehicle camera feed is identified as the currently-selected camera feed;
alter an appearance of the mirror portion of the first vehicle rearview mirror assembly icon when the first rear vehicle camera feed is identified as the currently-selected camera feed; and
alter an appearance of the mirror portion of the second vehicle rearview mirror assembly icon when the second rear vehicle camera feed is identified as the currently-selected camera feed;
wherein the altering the appearance of the mirror portions of the first vehicle rearview mirror and the second vehicle rearview mirror includes suppressing display of the currently-selected camera feed within the mirror portions.

\* \* \* \* \*